United States Patent

Nowicke, Jr.

[11] Patent Number: 6,016,797
[45] Date of Patent: Jan. 25, 2000

[54] BARBECUE GRILL WITH SMOKER AND WATER PAN CONVERSION

[76] Inventor: Frank L. Nowicke, Jr., 19358 Ossenfort Ct., Glencoe, Mo. 63068

[21] Appl. No.: 08/800,794

[22] Filed: Feb. 14, 1997

[51] Int. Cl.[7] .............................. A47J 37/00; A23L 29/02
[52] U.S. Cl. ........................ 126/25 R; 126/9 R; 99/340; 99/444; 99/482
[58] Field of Search ...................... 126/9 B, 9 R, 126/19 M, 20, 25 R, 26, 30, 275 R; 99/339, 340, 444, 449, 450, 448, 482, 481, 352

[56] References Cited

U.S. PATENT DOCUMENTS

| | | | |
|---|---|---|---|
| 1,005,919 | 10/1911 | Allen | 99/340 |
| 2,097,793 | 11/1937 | Howell | 126/25 R |
| 2,786,463 | 3/1957 | Vincent . | |
| 3,212,429 | 10/1965 | Lewus | 99/340 |
| 3,299,800 | 1/1967 | Angelo | 126/25 R |
| 3,359,963 | 12/1967 | Kostial | 99/340 |
| 3,851,639 | 12/1974 | Beddoe . | |
| 4,094,295 | 6/1978 | Boswell et al. . | |
| 4,300,444 | 11/1981 | Muse | 99/448 |
| 4,334,462 | 6/1982 | Hefling . | |
| 4,512,249 | 4/1985 | Mentzel . | |
| 4,535,749 | 8/1985 | Schlosser et al. . | |
| 5,564,330 | 10/1996 | Nowicke, Sr. . | |
| 5,592,871 | 1/1997 | Bartlett | 99/449 |
| 5,755,151 | 5/1998 | Nowicke, Sr. | 99/340 |

FOREIGN PATENT DOCUMENTS

| | | | |
|---|---|---|---|
| 101214 | 7/1936 | Australia | 99/339 |
| 337158 | 11/1903 | France | 99/340 |
| 683116 | 10/1939 | Germany | 99/448 |
| 7915 | 5/1884 | United Kingdom | 99/340 |

*Primary Examiner*—James C. Yeung
*Assistant Examiner*—David Lee
*Attorney, Agent, or Firm*—Polster, Lieder, Woodruff & Lucchesi

[57] ABSTRACT

A barbecue grill modified by a smoke directing sleeve to convert the grill into a food smoker in which there is a sleeve of rolled form adapted to be unrolled to fit on the grill to position a food supporting grill spaced from the source of heat, and providing handles on the sleeve in position to allow removal of the sleeve to free up access to the fuel in the cooking grill. The rolled form constitutes a kit and the kit is adapted to extend the utility of the barbecue grill for food smoking treatment.

3 Claims, 3 Drawing Sheets

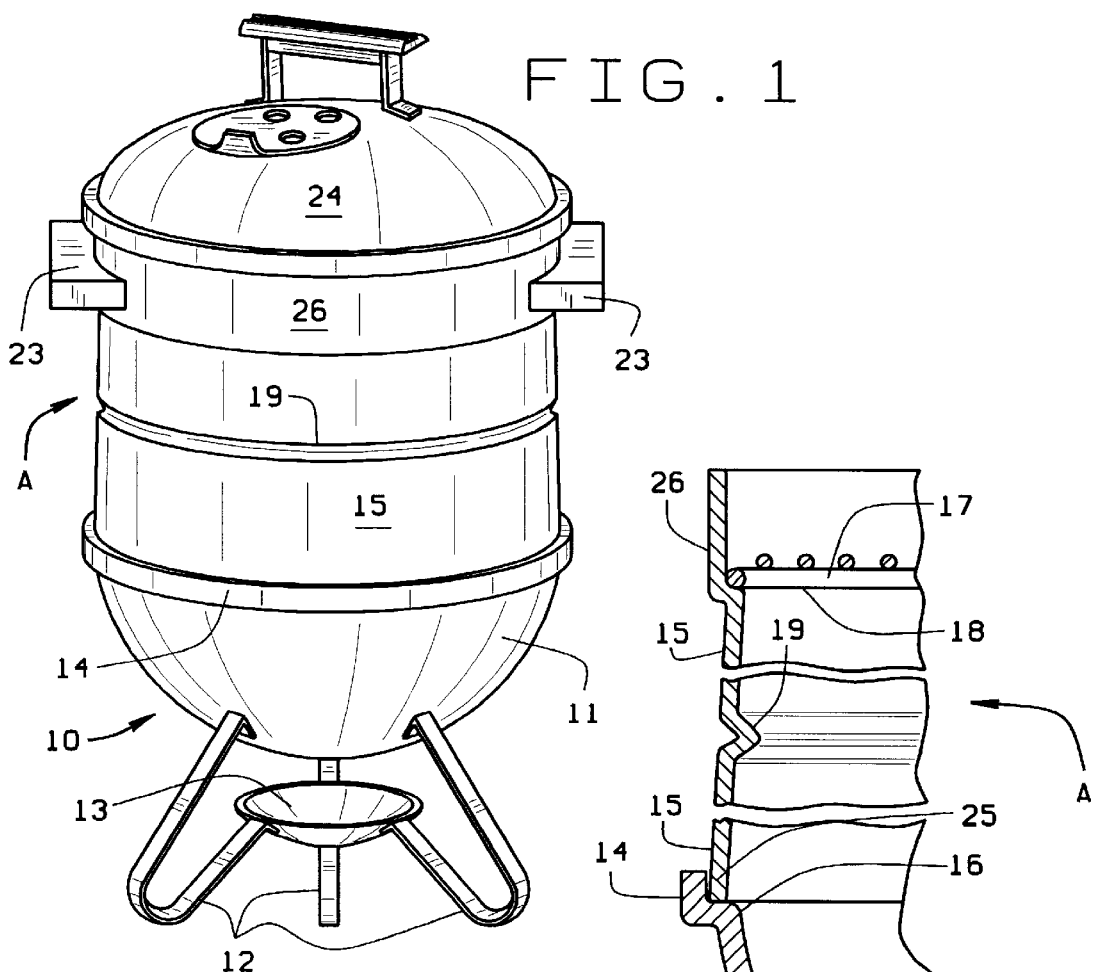
FIG. 1
FIG. 3
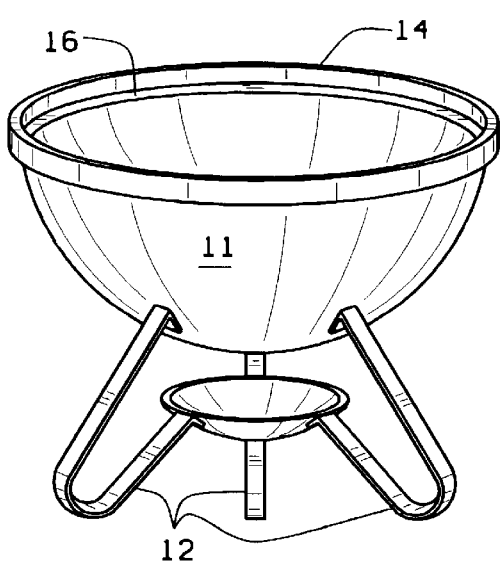
FIG. 2

BARBECUE GRILL WITH SMOKER AND WATER PAN CONVERSION

BACKGROUND OF THE INVENTION

1. Field of the Invention

This invention is directed to a barbecue grill and smoker conversion for rendering a barbecue grill cooker convertible into a smoker in which the grill can increase its utility by being converted to a smoker equipped with a water pan.

2. Description of the Prior Art

The relevant prior art for barbecue devices is known to have a bowl in which the fuel for cooking is deposited beneath a grill which supports the objects to be cooked. The cooker is provided with a cover to reflect the heat back to the grill to retain the heat and smoke. While smoke can influence the taste characteristics of the objects placed on the grill, the closeness of the objects on the grill to the heat of the burning fuel results in rapid cooking which prevents obtaining a desired smoked taste quality.

Some barbecue grills may be able to convert to a smoker in a single embodiment, such as shown in a Weber-Stephen Model No. 2890. That embodiment requires an access door to the fire area for the addition of fuel. The objection is that the method of introducing fuel for smoking is very haphazard in regard to being able to establish the right amount of fuel which is an important aspect for obtaining good smoking results.

BRIEF SUMMARY OF THE INVENTION

The object of the invention is to convert a barbecue grill type cooker to one that has a recessed grill to support smoked product as an added feature to the normal use as a grill cooker.

A further object is to produce a smoker feature for a grill cooker by providing a lift-off smoker sleeve to make access easy to the fire area.

Yet another object is to provide a smoker device that is easily removed while hot so that the fuel can be controlled as to content and amount to provide a desired smoke result.

Still another object is to provide a recessed smoker device that can be quickly and easily removed and replaced so as not to disturb or cool the product during the smoking process.

In addition, fuel for smoking can be easily dampened to produce the quality of smoke that is desired, the fuel dampening step being accomplished before or during the smoking effect by the disposition of a water pan between the fuel and the grill for the objects to be smoked. Other objects will be referred to in the following details of the smoker device disclosed in a preferred embodiment in drawings as follows.

BRIEF DESCRIPTION OF THE SEVERAL VIEWS OF THE DRAWING

A preferred embodiment of the invention is seen in the several drawing views, wherein:

FIG. 1 is a perspective view of a smoker assembly for converting a cooking grill to a use as a smoker;

FIG. 2 is a view of the base unit of a fuel holder useful in the smoker of FIG. 1;

FIG. 3 is a fragmentary view of the smoker assembly to show the recessing of the smoker grill above the fuel supporting grate;

DETAILED DESCRIPTION OF THE INVENTION

Figure 5:
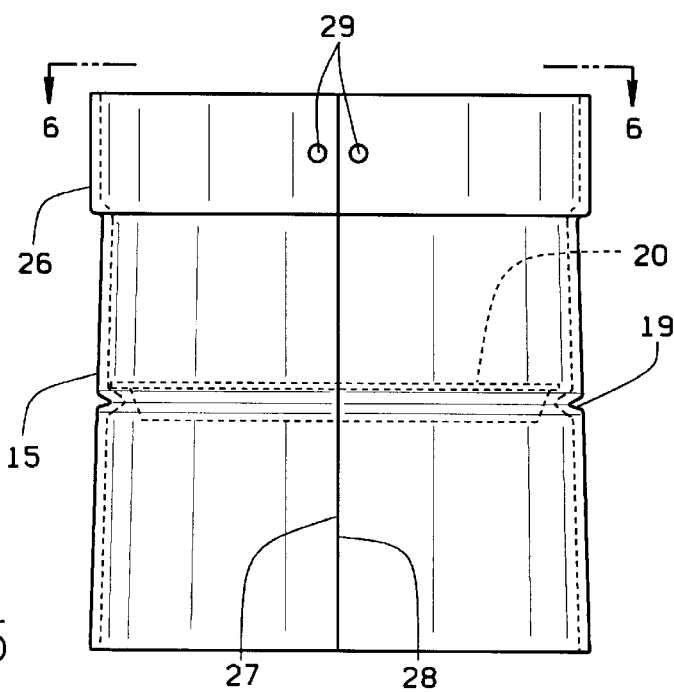
FIG. 5 is a view of a smoker sleeve in its rolled up form as an adapter to be mounted on the base seen in FIG. 2.
Figure 6:
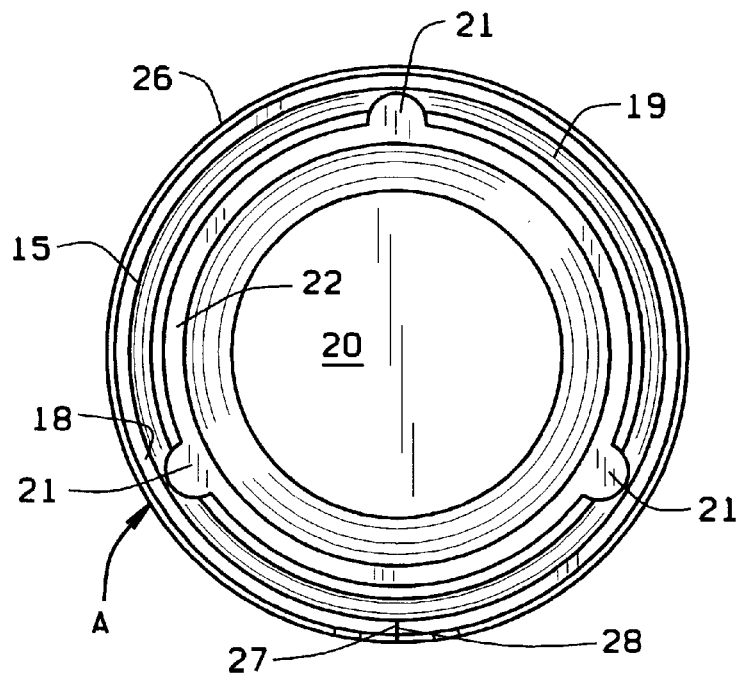
FIG. 6 is a plan view of the sleeve seen at line 7—7 in FIG. 5.

A preferred embodiment of a grill cooker 10 with a smoker conversion adapter sleeve A comprises a fire containing base 11 supported on at least three tripod legs 12 which carry an ash receiver 13. The base 11 is formed with an upwardly presented rim 14. The base 11 supports a smoker conversion adapter sleeve A in the form of a cylindrical member 15 which has a circumferential size selected to fit within the base seat 16 formed within the rim 14 seen in FIG. 2. A fragmentary sectional view of the assembly seen in FIG. 3 has the cylindrical sleeve 15 formed to support a food supporting grill 17 on the upper inner presented step shelf 18 of an extension 25 on the sleeve 15 so food to be smoked can be retained sufficiently above the heat from the base 11 to slow the cooking process and to give the rising smoke time to penetrate the food supported on the grill 17. The assembly seen in FIG. 3 illustrates an important aspect of the invention which is the shaping of the adapter sleeve 15 with a circumferentially and inwardly directed support surface 19 spaced from and below the grill 17 in the stepped shelf 18 of the cylindrical sleeve 15. The grill 17 is spaced from the grate 11A on which the fuel can be placed and between the base 11 and the shelf 18 there is a circumferentially inwardly directed formed seat 19 to support a metallic type water pan 20 seen in FIGS. 5 and 6. The pan provides a group of support projection 21 (FIG. 6) spaced around the pan rim 22 to engage on the seat 19 so hot gases can circulate up past the projects 21 to the grill 17. A pair of handles 23 FIG. 1 can be secured on opposite sides of the sleeve 15 to permit manual movement of the sleeve when access is desired to the base 11.

It will be appreciated from the views of FIGS. 1, 2, 3 and 4 that an important feature of the embodiment resides in the easy ability to lift the sleeve member 15, with or without a cover 24, off the base 11 by grasping the non-heat absorbing handles 23 and lifting the sleeve member 15 off to expose the heat source supported on the base 11. This procedure can be accomplished without disturbing the food on the grill 17 or without removing the cover 24 which could retain the heat and smoke while adjusting the fuel on the grate 11A or adding more fuel.

Figure 4:
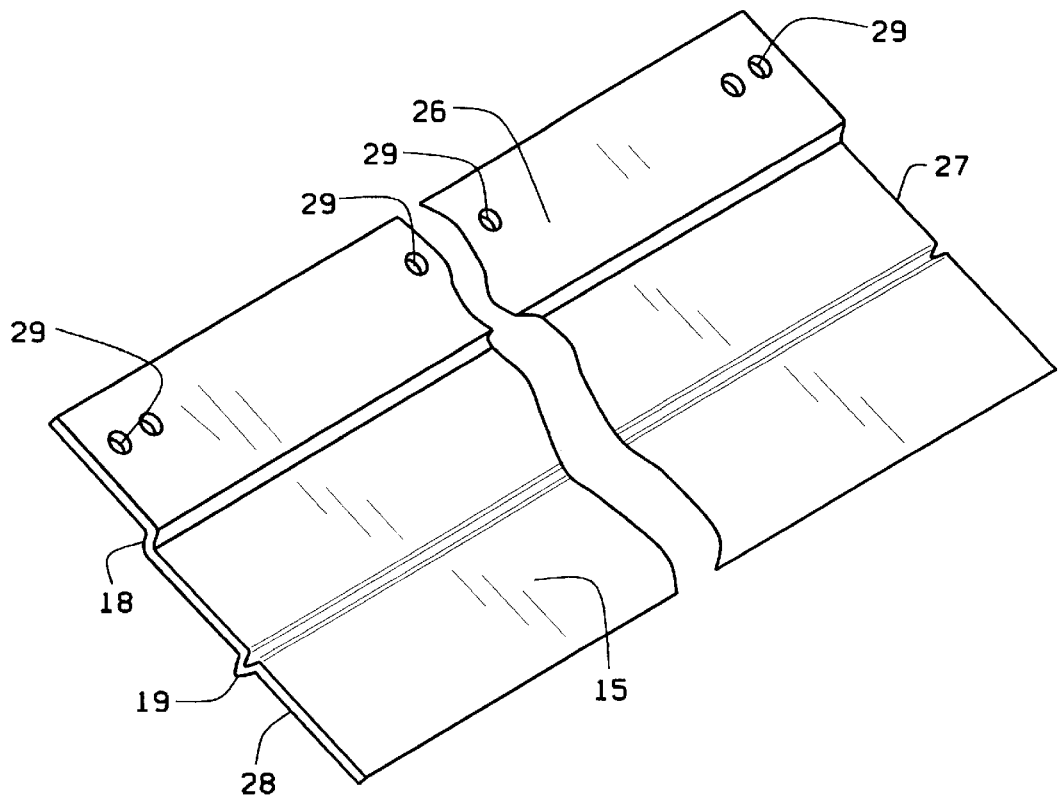
FIG. 4 is a plan view of the smoker sleeve in its laid out flat condition.

A unique feature of the invention is disclosed in the views of the drawings of FIGS. 3 and 4 inclusive. For example, in FIG. 3 the sleeve 15 is circumferentially sized so its bottom end 25 fits into the stepped base seat 16 of the base 11 while its opposite upper open end is formed with an axially extending circumferential flange 26 to surround an internal step shelf 18. The spaced ends 25 and 26 are manually positionable by handles 23 having threaded elements projecting through the flange 26 and into the handle. The flange 26 is formed with punched apertures 29 to receive the handle attachment threaded elements which can be employed in pairs in a well understood usual manner. The view of FIG. 4 shows a pair of apertures 29 to receive handle elements 23 to secure a handle to bridge the butt joint at ends 27 and 28 seen in FIG. 5.

The sheet metal seen in FIG. 4 is unique in that there is the elongated metallic sheet 15 having a first surface in one plane and a second surface 25 in a second plane which is off set from the first plane. When the metallic sheet is rolled into a cylindrical sleeve A the off set plane exposes a shelf surface 18 where the two planes meet with the shelf 18 on top of the first surface. Thus, as seen in FIG. 3, the grill 17 is seated on that shelf to be spaced from the heat in the base grate 11A. The material of the sleeve 15 when rolled into the adapter A can be any suitable metal having a thickness capable of providing suitable cylindrical strength and stiffness as desired. The formation of the adapter sleeve A has the character illustrated in the drawings.

Figure 7:
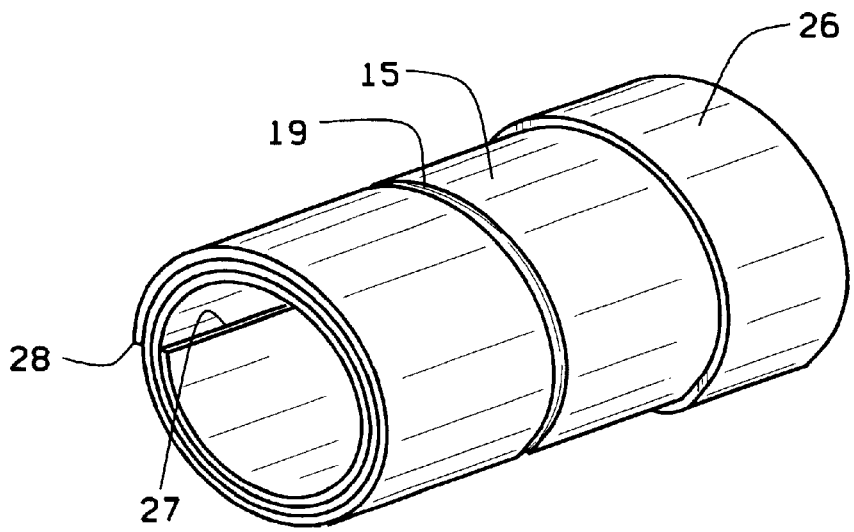
FIG. 7 is a perspective view of a rolled-up form of the invention arranged to be merchandised in a sales kit to convert a cooker grill to a smoker.

A further unique feature of the invention is seen in FIG. 7. In that view, the flat-formed elongated sleeve A is rolled into a tubular shape until it assumes a suitable diameter to be slidably received in a merchandising box with a pair of handles 23 and associated hardware enclosed inside the sleeve before the box is closed. Thus, the sleeve 15 and handles 23 with the described hardware, can be sold in kit form to be assembled in the manner shown in FIG. 1 to convert a cooking grill to a smoker from a kit form to an adapter A.

While a preferred embodiment of the invention has been described in the foregoing description, it can be appreciated that the sleeve and handles can be merchandised in loose form. Furthermore, the adapter A can have a straight cylindrical shape, or the sleeve can have a trapezoid shape by cutting the ends 27 and 28 so as to have an angular relation which will result in the sleeve being conically shaped when the cut ends are placed in abutment.

What is claimed is:

1. A food smoker including an adapter and a barbecue grill having a fuel supporting base providing an upwardly facing open rim, the adapter comprising:
   a) a sleeve having an open bottom fitted to seat on said fuel supporting base open rim, said sleeve enclosing space above said fuel supporting base and having an integrally formed seat surface circumferentially indented into said sleeve and spaced above said fuel supporting base open rim;
   b) an extension on said sleeve projecting above said integrally formed seat surface forming an outlet open end, said extension on said sleeve forming an internal shelf surface in the internal surface of said sleeve extension;
   c) a food supporting grill seated on said internal shelf surface; and
   d) a water receiving pan fitted into said sleeve interior to rest upon said integrally formed seat surface.

2. The food smoker set forth in claim 1 wherein said water receiving pan has projections spaced circumferentially to engage on said integrally formed seat surface for spacing said water receiving pan from the interior of said sleeve to form air flow spaces to pass smoke upwardly to said food supporting grill.

3. An adapter for barbecue grill conversion to a food taste enhancer smoker, the adapter comprising:
   a) an elongated metallic sheet having a first circumference surface in a first plane and a second circumference surface in a second plane, with said second plane being off set from said first plane to define an enlarged grill support shelf, said metallic sheet being rolled initially into a cylindrical form in which said off set second plane has an enlarged cylindrical form positioned to expose said enlarged grill support shelf between said second plane of said elongated metallic sheet and the first plane of said elongated metallic sheet,
   b) cylindrical inwardly off set projection in said first circumference surface forming an inwardly off set seat surface;
   c) handle means attached to said metallic sheet to secure said metallic sheet in said circumferential form sized to fit on a fuel containing base;
   d) a food supporting grill supported inside said metallic sheet in said circumferential form, on said enlarged grill support surface adapted to be spaced from the fuel containing base; and
   e) a water pan with projections engaged on said inwardly off set seat surface to support said water pan and allow the fuel smoke to pass upwardly beyond said inwardly off set seat surface and reach said food supporting grill.

\* \* \* \* \*